Nov. 11, 1958  A. C. SAMPIETRO  2,860,300
ELECTRIC CIRCUIT
Filed May 27, 1957
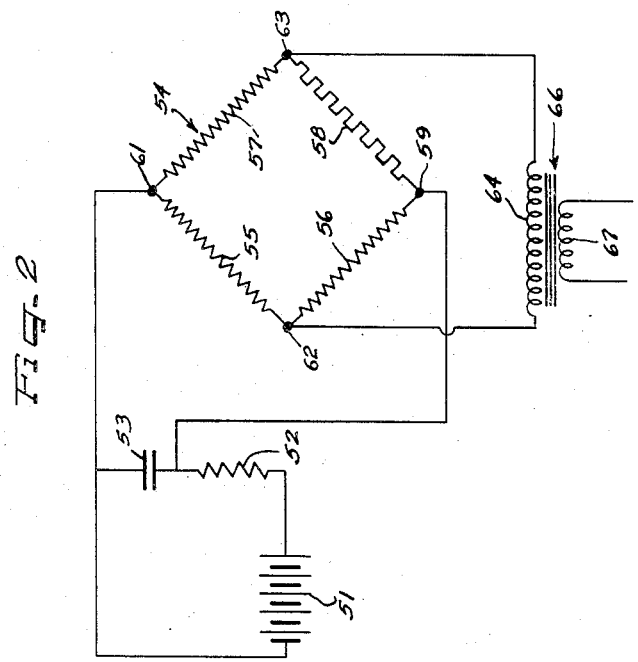
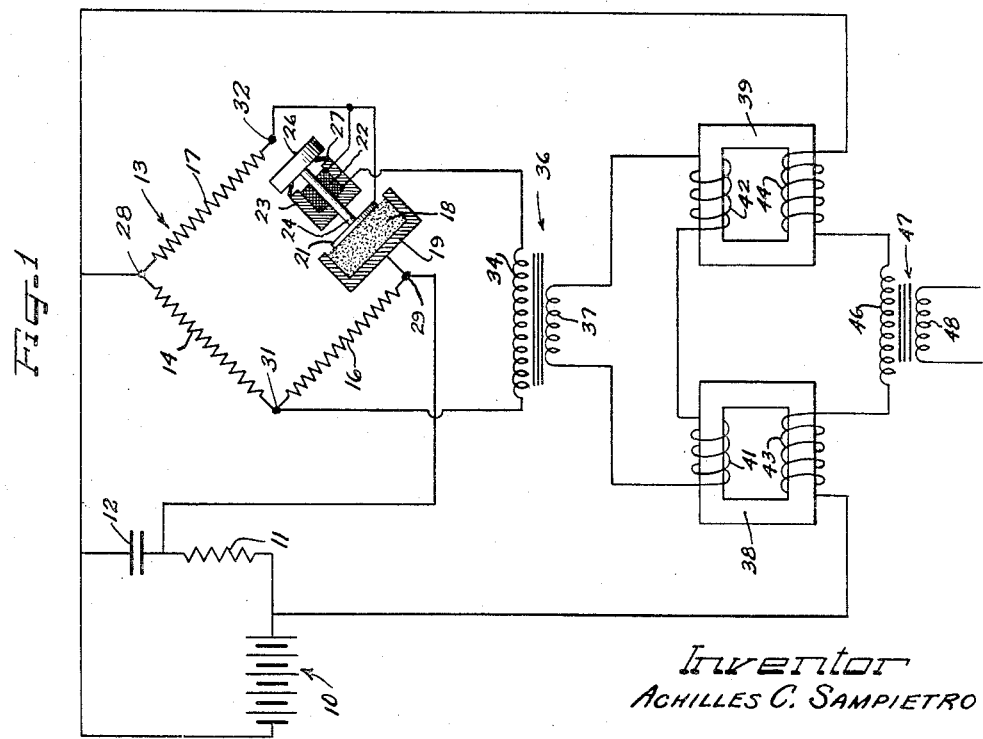
Inventor
ACHILLES C. SAMPIETRO
by Hill, Sherman, Meroni, Gross + Simpson
Attys.

2,860,300
ELECTRIC CIRCUIT

Achilles C. Sampietro, Detroit, Mich., assignor to Thompson Products, Inc., Cleveland, Ohio, a corporation of Ohio Application May 27, 1957, Serial No. 661,696

5 Claims. (Cl. 321—45)

The present invention relates to a system for generating an alternating current from a direct current source. The system can be employed to advantage in any environment such as an automobile or aircraft where it is desired to provide alternating current from a power supply which consists of a battery or other direct current source.

An object of the present invention is to provide a compact system for transforming direct current into alternating current of relatively low frequency.

Still another object of the invention is to provide an economical and relatively simple means for securing an alternating current output from a suitable direct current source.

Other objects and features of the present invention will be apparent to those skilled in the art from the following description of the attached sheet of drawings in which:

Figure 1 is a somewhat schematic circuit diagram of an alternating current generating system employing the principles of the present invention; and Figure 2 is a somewhat schematic circuit diagram of a modified form of the invention.

As shown on the drawings:

In Figure 1, reference numeral 10 indicates generally a battery or other suitable direct current source. An RC network consisting of a resistor 11 and a capacitor 12 are connected in series across the battery 10.

Connected across the capacitor 12 is a resistive bridge circuit generally identified at numeral 13 in the drawings. Three arms of the bridge circuit 13 are provided by fixed resistors 14, 16, and 17 connected in the normal bridge arrangement. The fourth arm of the bridge comprises a variable resistance means including a carbon pack 18 disposed in a suitable container 19 and having a pressure platen 21 arranged to periodically vary the pressure on the carbon pack 18 and thereby change its electrical resistance.

The movement of the platen 21 is governed by a solenoid 22 contained within a suitable housing 23. A stem 24 extends from the platen 21 through the housing 23 and the solenoid coil 22. A head 26 is secured to the upper end of the stem 24, and a spring washer 27 or other suitable resilient means is interposed between the housing 23 and the head 26 to bias the platen 21 in a preselected pressure applying position with respect to the carbon pack 18. As described in a succeeding portion of this specification, the platen 21 remains in this predetermined position until such time as sufficient current flows through the solenoid 22 to depress the platen 21 by overcoming the bias provided by the spring washer 27. When this occurs, the platen 21 applies more pressure against the carbon pack 18 and thereby decreases the effective electrical resistance of the carbon pack 18.

The input to the bridge circuit 13 is represented at the terminals 28 and 29 at diagonally opposite portions of the bridge circuit. As seen in Figure 1, the input to the bridge circuit 13 is connected directly across the capacitor 12 so that the current flow through the resistors 14, 16, 17, and the carbon pack 18 is governed by the charging and discharge currents at the capacitor 12.

From Figure 1, it will be seen that the resistor 17 and the variable resistance represented by the carbon pack 18 are shunted across the capacitor 12 and influence the charging and discharge cycles of the capacitor 12. It is the variable resistance represented by the carbon pack 18 that causes the oscillations to occur in the circuit at the natural frequency determined by the physical characteristics of the head 26, the platen 21, and the spring washer 27.

The output of the bridge circuit 13 is represented at terminals 31 and 32. The output circuit for the bridge circuit 13 includes the solenoid coil 22, and a primary winding 34 of a transformer indicated at numeral 36 in Figure 1.

With the system illustrated in Figure 1, the battery 10 will send a charging current to the capacitor 12 at a rate dependent upon the time constant of the circuit. During the charging cycle, the bridge circuit 13 is not in electrical balance and a current appears at the output between the terminals 31 and 32. This current passes through the solenoid coil 22 and, when the current reaches a sufficiently high value, the solenoid serves to attract the head 26 against the biasing force provided by the spring washer 27. As the head 26 moves inwardly, the platen 21 applies a greater pressure against the carbon pack 18 and thereby decreases the resistance of this arm of the circuit. The additional current drain provided by the lowering of the resistance causes the capacitor 12 to commence discharging and sending additional current through the carbon pack 18. As this happens, the bridge circuit 13 achieves a more nearly balanced condition electrically, and the current in the solenoid 22 decreases so that the spring washer 27 is able to return the head 26 and the platen 21 to their original position. The battery 10 is then able to resume charging the capacitor 12 for another cycle of operation.

This periodic variation in the electrical characteristics of the bridge circuit is reflected as a periodically varying current in the output between the terminals 31 and 32 of the bridge circuit. This current passes through the primary winding 34 of the transformer 36 and thereupon is inductively coupled to a secondary winding 37 of the transformer 36.

The output of the transformer 36 is connected to a magnetic amplifier circuit consisting of a pair of saturable reactors 38 and 39 having control windings 41, 42 connected in series across the secondary winding 37. A pair of load windings 43 and 44 deliver the output of the magnetic amplifier to a primary 46 of a transformer 47. With this arrangement, the output voltage appearing at a secondary 48 of the transformer 47 has a frequency twice the frequency of the current circulating in the bridge circuit 13.

A modified form of the invention is illustrated in Figure 2 of the drawings. This form of invention employs a direct current source such as a battery 51 across which there appears an RC network consisting of a resistor 52 and a capacitor 53, the resistance and capacitance values of the RC network being such as to provide a reasonably long time constant.

Disposed across the capacitor 53 is a bridge circuit 54 consisting of three fixed resistors 55, 56 and 57 forming three legs of the bridge, and a resistance element 58 forming the other leg of the bridge. The resistance element 58 consists of a material such as a mixed ferrite having the property of evidencing a reduction in electrical resistance as the voltage applied across the element increases. Such mixed ferrite compositions are well-known commercially and need not be described with further particularity in this specification.

The input to the bridge circuit 54 appears across opposed terminals 59 and 61 while the output of the bridge circuit appears across opposed terminals 62 and 63.

In this form of the invention, as the battery 51 commences charging the capacitor 53, the voltage across the resistor element 58 increases, but the current through the element 58 increases at a more rapid rate than the voltage increase causing a varying output to appear across the terminals 62 and 63. Mathematically, the voltage across the resistor 58 varies almost linearly with respect to time during the initial portion of the charging cycle, while the current through resistance elements of this type varies as a higher power, usually about the fourth power, of the voltage applied. It is this non-linear characteristic of the current and voltage relation that provides and sustains the oscillations. The capacitor 53 will commence discharging prior to the time it is fully charged by the battery 21 and will continue discharging through the resistor element 58 until such time as the battery 51 is again able to resume charging of the capacitor 53.

The output appearing between the terminals 62 and 63 energizes the primary 64 of a transformer 66, and a periodically varying voltage appears across the secondary 67 of the transformer 66 in response to variations in the bridge circuit.

From the foregoing it will be evident that the systems of the present invention provide a simplified, compact means for generating an alternating current of relatively low frequency from a direct current source. It will also be evident that various modifications can be made to the described embodiments without departing from the scope of the present invention.

I claim as my invention:

1. An alternating current generating system comprising a direct current source, a resistor and capacitor network across said source, said capacitor being arranged to be charged from said source, a resistive bridge circuit disposed across said capacitor, one arm of said bridge circuit comprising a resistive element whose resistance decreases as the voltage across said arm increases, and means for sensing the current changes in said resistive element.

2. An alternating current generating system comprising a direct current source, a resistor and capacitor network across said source, said capacitor being arranged to be charged from said source, a resistive bridge circuit disposed across said capacitor, one arm of said bridge circuit comprising a variable pressure carbon pack and a solenoid operated mechanism for varying the pressure on said pack, circuit means connected to said mechanism to render said mechanism responsive to changes in the charging current on said capacitor, and circuit means responsive to changes in voltage across said carbon pack.

3. An alternating current generating system comprising a direct current source, a resistor and capacitor network across said source, said capacitor being arranged to be charged from said source, a resistive bridge circuit disposed across said capacitor, said bridge circuit consisting of three fixed resistors in combination with a variable pressure carbon and a solenoid operated mechanism for varying the pressure on said pack, circuit means connected to said mechanism to render said mechanism responsive to changes in the charging current on said capacitor, and circuit means responsive to changes in voltage across said carbon pack.

4. An alternating current generating system comprising a direct current source, a resistor and capacitor network across said source, said capacitor being arranged to be charged from said source, a resistive bridge circuit disposed across said capacitor, one arm of said bridge circuit comprising a variable pressure carbon pack and a solenoid operated mechanism for varying the pressure on said pack, circuit means connected to said mechanism to render said mechanism responsive to changes in the charging current on said capacitor, and a transformer connected to the output of said bridge circuit and responsive to changes in voltage across said carbon pack.

5. An alternating current generating system comprising a direct current source, a resistor and capacitor network across said source, said capacitor being arranged to be charged from said source, a resistive bridge circuit disposed across said capacitor, one arm of said bridge circuit consisting of a resistance element whose resistance varies as the applied voltage increases, and a transformer across the output of said bridge circuit and energized thereby.

References Cited in the file of this patent

UNITED STATES PATENTS

| 2,449,072 | Houghton | Sept. 14, 1948 |
| 2,715,718 | Holtje | Aug. 16, 1955 |

FOREIGN PATENTS

| 280,652 | Switzerland | May 16, 1952 |

OTHER REFERENCES

Proceedings of the I. R. E. (September 1955) (page 1054).